(12) United States Patent
Decker et al.

(10) Patent No.: US 10,554,701 B1
(45) Date of Patent: Feb. 4, 2020

(54) REAL-TIME CALL TRACING IN A SERVICE-ORIENTED SYSTEM

(71) Applicant: Amazon Technologies, Inc., Seattle, WA (US)

(72) Inventors: Michael David Decker, Kent, WA (US); Aaron Ben Fernandes, Redmond, WA (US); Anton Vladilenovich Goldberg, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/948,993

(22) Filed: Apr. 9, 2018

(51) Int. Cl.
*H04L 29/06* (2006.01)
*G06F 21/55* (2013.01)
*H04L 9/32* (2006.01)
*H04L 12/927* (2013.01)

(52) U.S. Cl.
CPC .......... *H04L 65/4007* (2013.01); *G06F 21/55* (2013.01); *H04L 9/32* (2013.01); *H04L 47/801* (2013.01)

(58) Field of Classification Search
CPC ..... H04L 65/4007; H04L 9/32; H04L 47/801; G06F 21/55
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,585,776 B1 | 7/2003 | Bates et al. | |
| 6,640,241 B1 | 10/2003 | Ozzie et al. | |
| 6,651,243 B1 | 11/2003 | Berry et al. | |
| 6,675,153 B1 | 1/2004 | Cook et al. | |
| 6,742,030 B1 | 5/2004 | MacPhail | |
| 6,751,789 B1 | 6/2004 | Berry et al. | |
| 6,772,395 B1 | 8/2004 | Hyman et al. | |
| 6,973,459 B1 | 12/2005 | Yarmus | |
| 7,058,928 B2 | 6/2006 | Wygodny et al. | |
| 7,194,466 B2 | 3/2007 | Chen et al. | |
| 7,209,548 B2 | 4/2007 | Ethier et al. | |
| 7,472,422 B1 | 12/2008 | Agbabian | |
| 7,496,799 B2 | 2/2009 | Prang et al. | |
| 7,594,008 B2 | 9/2009 | Toda et al. | |
| 7,603,367 B1 | 10/2009 | Kanter et al. | |

(Continued)

OTHER PUBLICATIONS

Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007.

(Continued)

*Primary Examiner* — Duc C Ho
(74) *Attorney, Agent, or Firm* — Robert C. Kowert; Kowert, Hood, Munyon, Rankin & Goetzel, P.C.

(57) ABSTRACT

Methods, systems, and computer-readable media for real-time call tracing in a service-oriented system are disclosed. A request comprising a trace signature is received at a service in a service-oriented system. The trace signature comprises a representation of one or more upstream services in an upstream call path associated with the request. Based at least in part on the trace signature, the service determines one or more actions to perform with respect to the request.

20 Claims, 8 Drawing Sheets

(56) References Cited

U.S. PATENT DOCUMENTS

| | | | |
|---|---|---|---|
| 7,680,850 B2 | 3/2010 | Oda | |
| 7,698,569 B2 | 4/2010 | Beiter et al. | |
| 7,716,322 B2 | 5/2010 | Benedikt et al. | |
| 7,761,500 B1 | 7/2010 | Eckert et al. | |
| 7,774,335 B1 | 8/2010 | Scofield et al. | |
| 7,778,972 B1 | 8/2010 | Cormie et al. | |
| 7,831,548 B1 | 11/2010 | Round et al. | |
| 7,836,039 B2 | 11/2010 | Clark et al. | |
| 7,836,051 B1 | 11/2010 | Mason | |
| 9,450,849 B1 * | 9/2016 | Goldberg | H04L 43/0876 |
| 9,559,928 B1 | 1/2017 | Porter et al. | |
| 9,560,011 B2 * | 1/2017 | Pal | G06F 21/552 |
| 9,626,275 B1 | 4/2017 | Hitchcock et al. | |
| 9,634,920 B1 | 4/2017 | Goldberg et al. | |
| 9,774,654 B2 * | 9/2017 | Tran | H04L 67/025 |
| 2002/0007413 A1 | 1/2002 | Garcia-Luna-Aceves et al. | |
| 2002/0078014 A1 | 6/2002 | Pallmann | |
| 2002/0112036 A1 | 8/2002 | Bohannon et al. | |
| 2003/0061550 A1 | 3/2003 | Ng et al. | |
| 2004/0267739 A1 | 12/2004 | Dowling | |
| 2005/0010653 A1 | 1/2005 | McCanne | |
| 2005/0138022 A1 | 6/2005 | Bailey et al. | |
| 2005/0138111 A1 | 6/2005 | Aton et al. | |
| 2005/0187905 A1 | 8/2005 | Dixon et al. | |
| 2005/0198333 A1 | 9/2005 | Dinges et al. | |
| 2005/0198334 A1 | 9/2005 | Farber et al. | |
| 2005/0210008 A1 | 9/2005 | Tran et al. | |
| 2005/0276388 A1 | 12/2005 | Ethier et al. | |
| 2006/0069717 A1 | 3/2006 | Mamou et al. | |
| 2006/0085766 A1 | 4/2006 | Dominowska et al. | |
| 2006/0265345 A1 | 11/2006 | Christian et al. | |
| 2006/0277203 A1 | 12/2006 | Uittenbogaard | |
| 2007/0055766 A1 | 3/2007 | Petropoulakis et al. | |
| 2007/0055916 A1 | 3/2007 | Prang et al. | |
| 2007/0201621 A1 | 8/2007 | Ethier et al. | |
| 2007/0266366 A1 | 11/2007 | Bucuvalas | |
| 2008/0031145 A1 | 2/2008 | Ethier et al. | |
| 2008/0115047 A1 | 5/2008 | Petri | |
| 2008/0163160 A1 | 7/2008 | Bloesch et al. | |
| 2008/0215755 A1 | 9/2008 | Farber et al. | |
| 2009/0013083 A9 | 1/2009 | Garcia-Luna-Aceves et al. | |
| 2009/0049429 A1 | 2/2009 | Greifeneder et al. | |
| 2009/0132441 A1 | 5/2009 | Muller et al. | |
| 2009/0228376 A1 | 9/2009 | Rollins et al. | |
| 2010/0122178 A1 | 5/2010 | Konig et al. | |
| 2010/0161629 A1 | 6/2010 | Palanisamy et al. | |
| 2012/0016959 A1 | 1/2012 | O'Laughlen et al. | |
| 2013/0019018 A1 | 1/2013 | Rice | |
| 2013/0304761 A1 | 11/2013 | Redlich et al. | |
| 2014/0025572 A1 | 1/2014 | Krajec | |
| 2014/0229737 A1 * | 8/2014 | Roth | H04L 9/0618 713/176 |
| 2017/0199806 A1 * | 7/2017 | Dahan | G06F 11/3636 |
| 2017/0206529 A1 * | 7/2017 | Raleigh | H04M 15/68 |
| 2017/0286274 A1 * | 10/2017 | Lau | G06F 11/3668 |

OTHER PUBLICATIONS

Benjamin H. Sigelman, Luiz Andre Barroso, Mike Burrows, Pat Stephenson, Manoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010.

U.S. Appl. No. 14/543,822, filed Nov. 17, 2014, Daniel Wade Hitchcock.

U.S. Appl. No. 12/410,313, filed Mar. 24, 2009, Jeff B. Beal et al.

U.S. Appl. No. 14/543,826, filed Nov. 17, 2014, Anton Vladilenovich Goldberg et al.

U.S. Appl. No. 13/950,070, filed Jul. 24, 2013, Anton Vladilenovich Goldberg et al.

U.S. Appl. No. 13/950,068, filed Jul. 24, 2013, Anton Vladilenovich Goldberg et al.

\* cited by examiner

REAL-TIME CALL TRACING IN A SERVICE-ORIENTED SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for implementing real-time call tracing in a service-oriented system are described. Using the techniques described herein, services may make real-time decisions about how to handle requests by analyzing session-persisted trace signatures associated with the requests. A session-persisted trace signature may uniquely represent a particular call path among services in a distributed system implemented according to a service-oriented architecture. The first service to receive a request may generate the trace signature using its unique service identifier, e.g., by hashing the service identifier. Each downstream service may, in turn, modify the trace signature by adding its own service identifier, e.g., by hashing the incoming trace signature along with the service identifier of the recipient. At any point in the call path, a trace signature may represent the upstream call path of the incoming request. The size of the trace signature may not change as the signature is passed downstream and updated. A downstream service may decide how to handle an incoming request based (at least in part) on its associated trace signature. Trace signatures may be associated with different tiers or categories that differ in priority. In one embodiment, if the service is under a heavy request load, then the service may selectively discard some requests based on the lower priorities of their trace signatures while performing other requests. The tiers or categories of trace signatures may be determined based (at least in part) on a Bloom filter or other space-efficient data structure that captures the different tiers or categories. In one embodiment, a particular service may obtain a Bloom filter from an external service that builds the filter, and afterward the particular service may analyze the trace signature of numerous requests using that filter. In some embodiments, other tasks such as selectively billing upstream services may be performed based (at least in part) on session-persisted trace signatures. In one embodiment, similar techniques may be used in a response path to allow real-time decision making for responses to requests.

As one skilled in the art will appreciate in light of this disclosure, embodiments may be capable of achieving certain technical advantages, including some or all of the following: (1) improving the availability of services for higher priority requests by enabling services to selectively drop lower priority requests, (2) reducing the latency of making decisions about how to handle incoming requests by eliminating the need to use an external tracing service for every request, (3) reducing network usage by permitting services to make real-time decisions based on upstream call paths of incoming requests without having to consult with another service for every request, (4) reducing network usage by maintaining trace signatures of a fixed size regardless of the size or complexity of the call path, (5) also reducing memory usage by maintaining trace signatures of a fixed size regardless of the size or complexity of the call path, (6) reducing network usage by capturing many different trace signatures in a Bloom filter or other space-efficient data structure, (7) also reducing memory usage by capturing many different trace signatures in a Bloom filter or other space-efficient data structure, (8) reducing network and memory usage by capturing the participation of upstream services in a fixed-size bitmap that is passed from service to service, (8) improving the security of a distributed system by permitting downstream services to detect intrusive or anomalous behavior, and so on.

Figure 1:
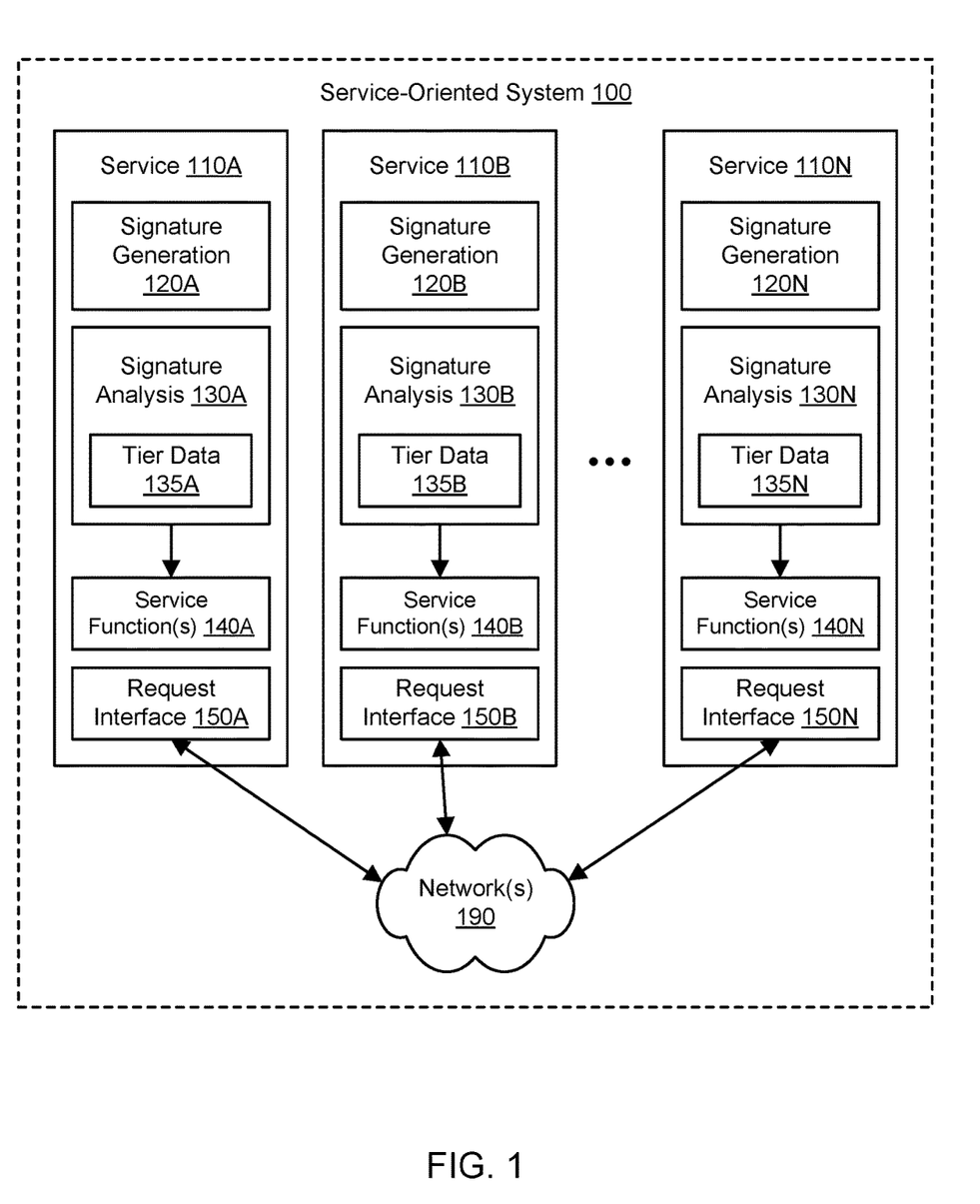
FIG. 1 illustrates an example system environment for real-time call tracing in a service-oriented system, according to one embodiment.

FIG. 1 illustrates an example system environment for real-time call tracing in a service-oriented system, according to one embodiment. The example system environment may include a distributed, service-oriented system 100. The service-oriented system 100 may implement a service-oriented architecture and may include multiple services 110A-110N configured to communicate with each other (e.g., through message passing) to carry out various tasks, such as business functions. Although three services 110A, 110B, and 110N are illustrated for purposes of example, it is contemplated that any suitable number of services may be used with the service-oriented system 100. Any of the services 110A-110N may represent different services (e.g., different sets of program code) or different instances of the same service. The services 110A-110N may be implemented using a plurality of hosts, any of which may be implemented by the example computing device 3000 illustrated in FIG. 7. The hosts may be located in any suitable number of data centers or geographical locations. In one embodiment, multiple services and/or instances of the same service may be implemented using the same host. It is contemplated that the service-oriented system 100 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. In one embodiment, a service may implement one or more functions that can be invoked by other services or by entities external to the system 100. For example, as shown in FIG. 1, service 110A may include one or more service functions 140A, service 110B may include one or more service functions 140B, and service 110N may include one or more service functions 140N.

A service may include one or more components that may also participate in the service-oriented system 100, e.g., by passing messages to other services or to other components within the same service. In one embodiment, a service may include a request interface through which the service may receive requests (e.g., from upstream services), respond to requests, issue requests to downstream services, and receive responses from downstream services. For example, as shown in FIG. 1, service 110A may include a request interface 150A, service 110B may include a request interface 150B, and service 110N may include a request interface 150N. The service-oriented system 100 may be configured to process requests from various internal or external systems, such as client computer systems or computer systems consuming networked-based services (e.g., web services). In general, services may be configured to perform any of a variety of business processes. For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.).

In some embodiments, a root request to a service in the service-oriented system 100 may originate from a variety of sources, such as a registered and/or authenticated user (e.g., a user registered with an online marketplace), an unregistered and/or unauthenticated user (e.g., a human browsing an online marketplace while not logged in), or a non-human entity (e.g., a program or "bot" that trawls product pages of an online marketplace to gather data). The different origins for requests may be associated with different call paths through the service-oriented system 100. Using the techniques described herein for real-time call tracing, individual services may be able to distinguish among different upstream call paths for incoming requests and make decisions about the requests accordingly.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, the service-oriented system 100 may be implemented in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. In one embodiment, the test environment may be used to analyze call paths for synthetic requests that are injected into the system 100. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

In one embodiment, to enable real-time call tracing, lightweight instrumentation may be added to services, including any of the services 110A-110N. The instrumentation may be implemented using a library or other program code that is run by individual services. For at least some of the services 110A-110N, the instrumentation may include a component for signature generation, such as components 120A, 120B, and 120N. For at least some of the services 110A-110N, the instrumentation may include a component for signature analysis, such as components 130A, 130B, and 130N. The signature generation 120A-120N may be used to generate or modify trace signatures that uniquely represent a particular upstream call path through the system 100. Although services 110A-110N are shown as implementing both signature generation and signature analysis, a service in the service-oriented system 100 may implement both signature generation and signature analysis, signature generation but not signature analysis, signature analysis but not signature generation, or neither signature generation nor signature analysis.

In one embodiment, a trace signature may be generated based (at least in part) on a unique service identifier for every service in the upstream call path as well as the service that generates or modifies the trace signature. The trace signatures may be provided with requests to downstream services. At downstream services, the signature analysis 130A-130N may be used to analyze the trace signatures in incoming requests and make decisions in real-time about how to handle the corresponding requests, e.g., without needing to consult with an external entity for every request. To perform the signature analysis 130A-130N, tier data such as data 135A, 135B, and 135N may be used. The tier data 135A-135N may include one or more data structures that associate particular trace signatures with particular tiers, categories, or priorities. An individual service may determine a tier, category, or priority for an inbound request based (at least in part) on its trace signature and on the tier data, and the service may make a decision accordingly. If a service is experiencing a heavy load of incoming requests, for example, then the service may drop a lower priority request but perform the function(s) invoked by a higher priority request.

In some embodiments, the services 110A-110N may generate and/or collect other types of trace data. The trace data may describe aspects of the service interactions. In one embodiment, the trace data may be generated in real-time or near real-time, e.g., as service requests and service responses are received and/or processed by the services. The trace data may include call path data or other data indicative of relationships between individual services, such as an identification of the calling (i.e., requesting) service and the called (i.e., requested) service for each interaction. The trace data may include metadata such as request identifiers that are usable to identify paths of service requests and responses from service to service. The trace data may also include data describing the performance of the service interactions. For example, the trace data may include data indicative of network latency for a request or response, data indicative of network throughput for one or more interactions, data indicative of service reliability or availability, data indicative of resource usage, etc.

In one embodiment, the signature generation may be enabled for some services but not others, e.g., such that services higher upstream may generate or modify trace signatures but services further downstream may not necessarily do so. In one embodiment, the signature analysis may be enabled for some services but not others, e.g., such that services experiencing heavy usage may enable the signature analysis but more lightly used services may not. In one embodiment, generation of trace data for a mere sample or subset of requests may not be necessary due to the relatively low overhead of the signature generation and signature analysis. In one embodiment, therefore, most or all requests through the system 100 may be subject to signature generation and/or signature analysis by the services for which those components are enabled.

Figure 2:
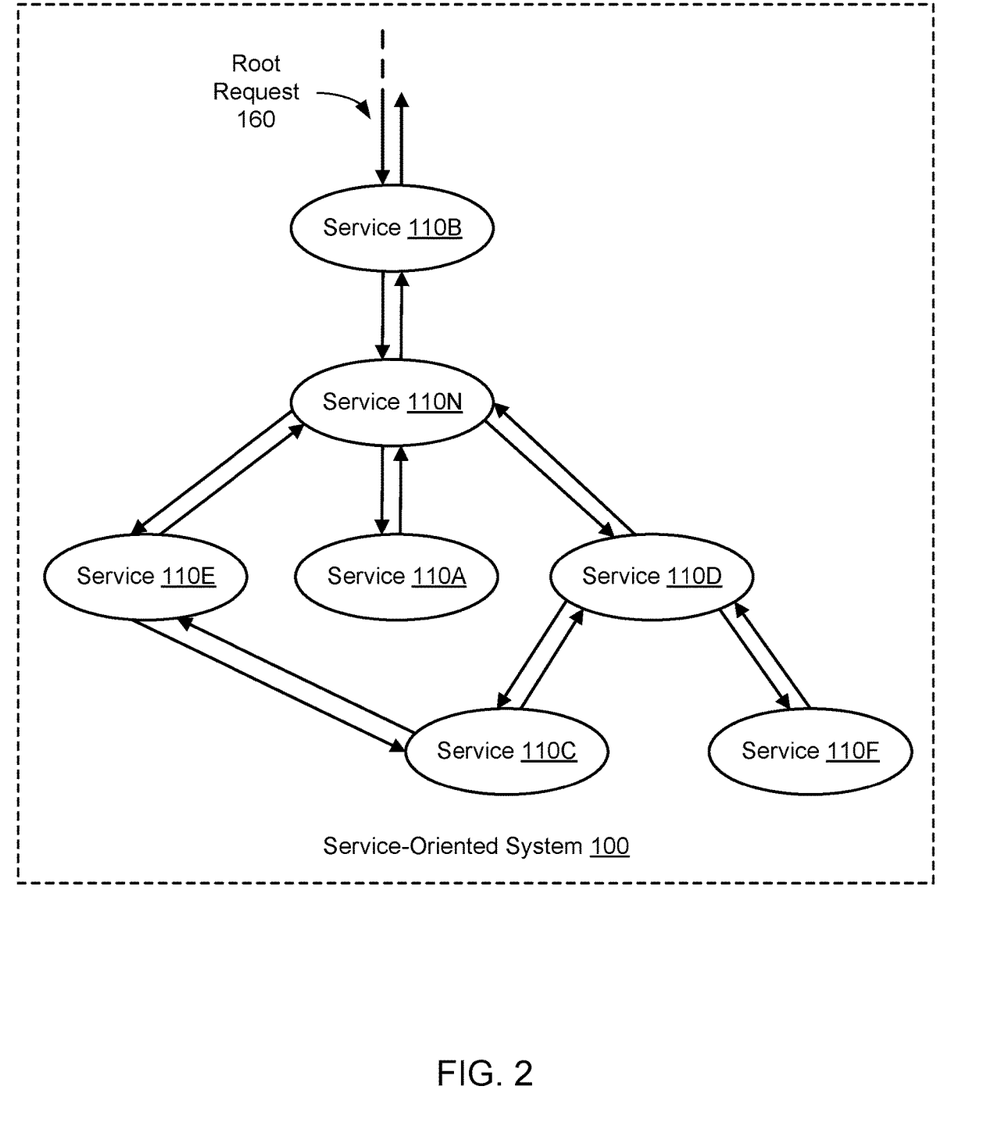
FIG. 2 illustrates further aspects of the example system environment for real-time call tracing in a service-oriented system, including an example of a call path among services in a service-oriented system, according to one embodiment.

FIG. 2 illustrates further aspects of the example system environment for real-time call tracing in a service-oriented system, including an example of a call path among services in a service-oriented system, according to one embodiment. In one embodiment, an initial request to an upstream service may take a route through numerous downstream services in the service-oriented system 100 in order to satisfy a particular initial request. FIG. 2 illustrates an example of a hierarchy of call pathways between services. The route may correspond to one or more call paths between services. The call paths may represent inbound service requests and outbound service requests relative to a particular service. To process a given received request, one or more services may be invoked. As used herein, an initial request such as request 160 may be referred to as the "root request." In various embodiments, the root request 160 may but need not originate from a computer system outside of the service-oriented system 100. In many embodiments, a root request may be processed by an initial service, which may then call one or more other services. Additionally, each of those services may also call one or more other services, and so on until the root request is completely fulfilled.

The particular services called to fulfill a request may correspond to a call graph that includes, for each particular service of multiple services called to fulfill the same root request, the service that called the particular service and any services called by the particular service. In the example call graph of FIG. 2, the root request 160 may be provided to a service 110B, which may then call a downstream service 110N to satisfy that root request. The service 110N may then call additional downstream services 110E, 110A, and 110D and potentially wait for responses from those services before responding to the request from the upstream service 110B. Similarly, the service 110D may call additional downstream services 110C and 110F and potentially wait for responses from those services before responding to the request from the upstream service 110N, and the service 110E may also call service 110C. Ultimately the service 110B may provide a response to the requesting entity. For example, if the root request 160 represents a request to view a product detail page in an online marketplace, then the various downstream services 110N, 110E, 110A, 110D, 110C, and 110E may collaborate to build that page dynamically, and the service 110B may then provide the page to the client that issued the root request 160.

In some embodiments, the root request 160 may originate from a variety of sources, such as a registered and/or authenticated user (e.g., a user registered with an online marketplace), an unregistered and/or unauthenticated user (e.g., a human browsing an online marketplace while not logged in), or a non-human entity (e.g., a program or "bot" that trawls product pages of an online marketplace to gather data). The different origins for requests may be associated with different call paths through the service-oriented system 100. Using the techniques described herein for signature generation and signature analysis, individual services may be able to distinguish among different call paths for incoming requests and make decisions about the requests accordingly. The individual services may be able to make such decisions in real-time or near-real-time and without needing to consult with any other service for every request. For example, requests may arrive at service 110C from two (or more) different upstream call paths. The techniques described herein may permit service 110C to distinguish between these upstream call paths and take action accordingly.

Figure 3A:
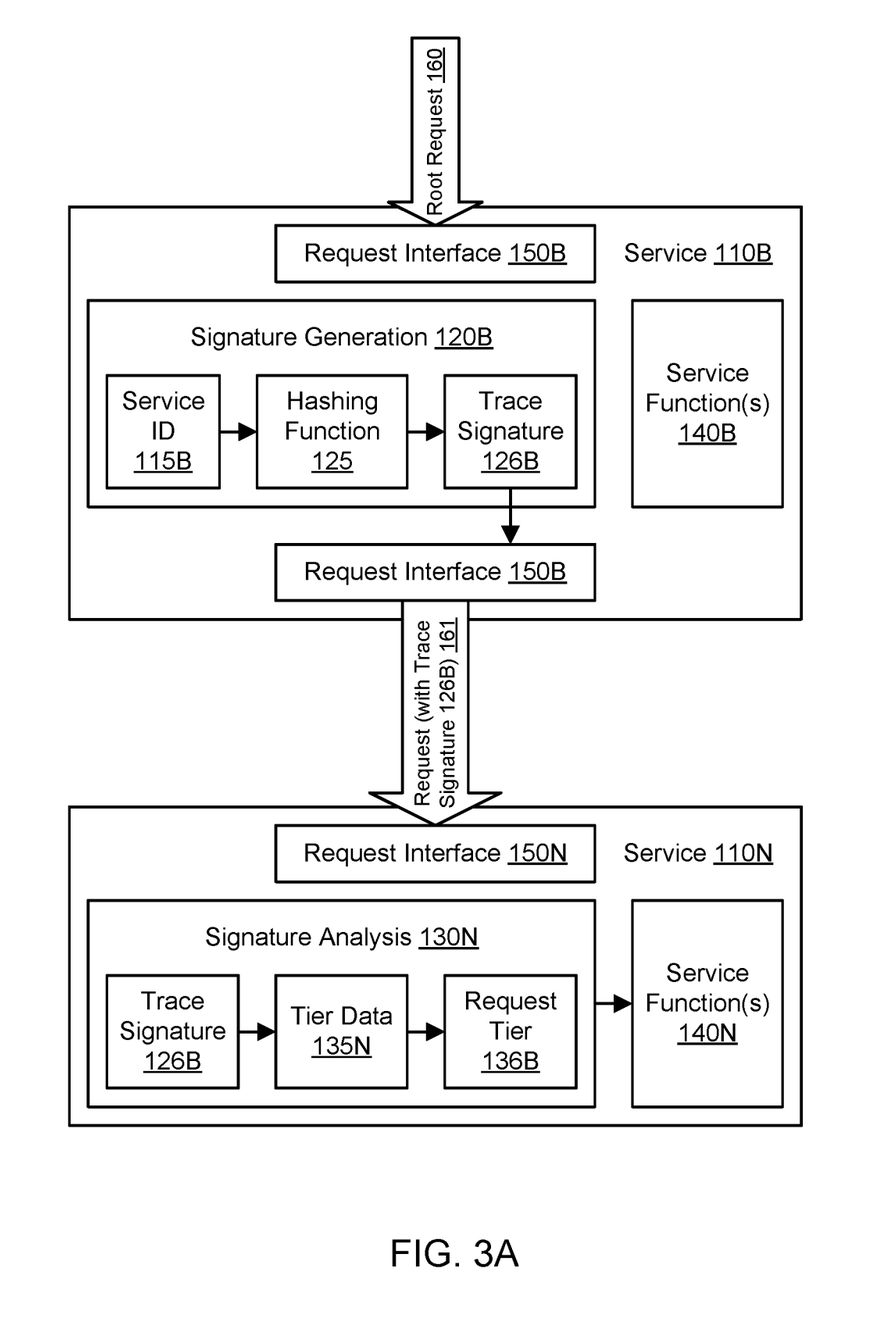
FIG. 3A illustrates further aspects of the example system environment for real-time call tracing in a service-oriented system, including the generation and passing of a trace signature from one service to another service, according to one embodiment.
Figure 3B:
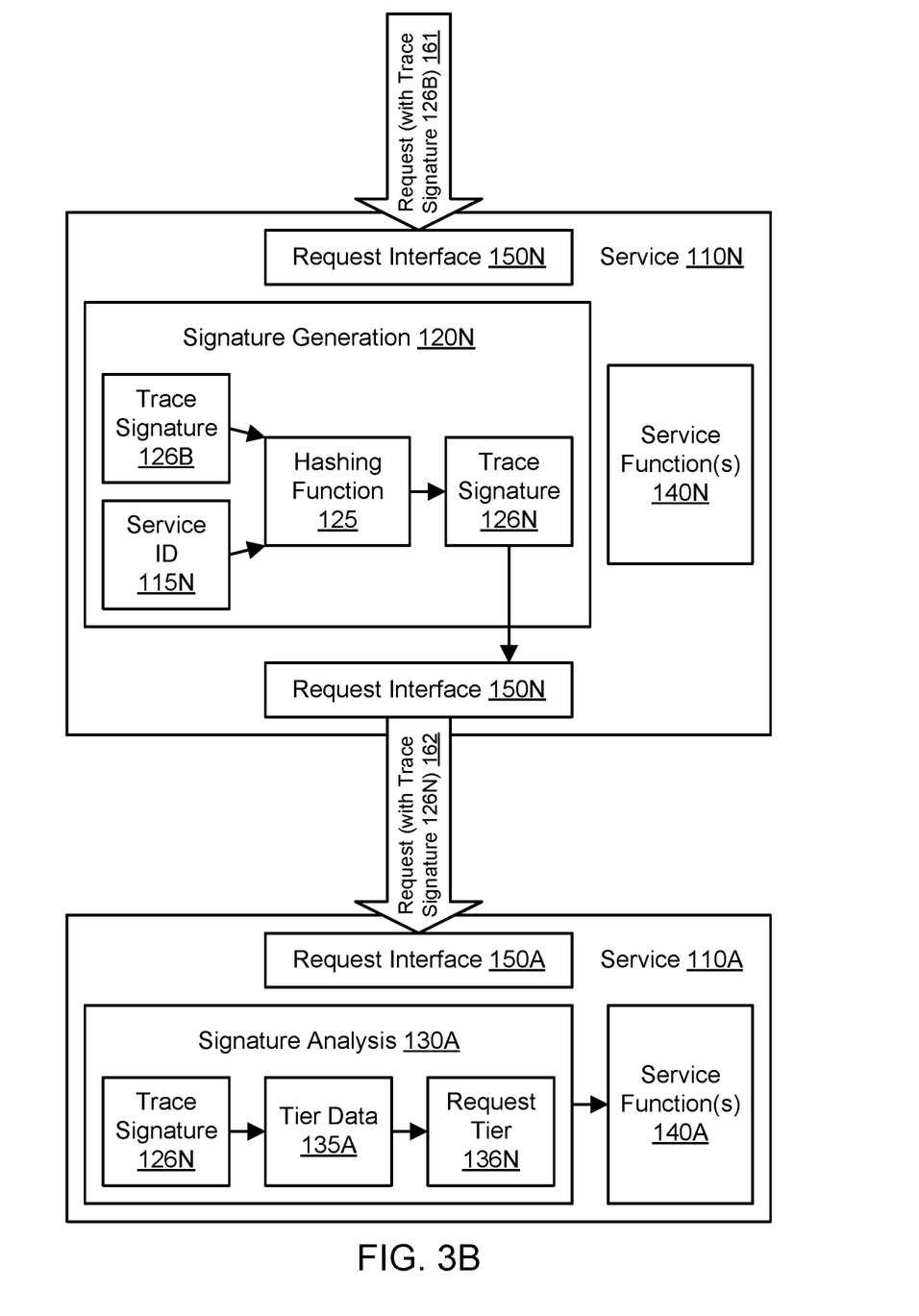
FIG. 3B illustrates further aspects of the example system environment for real-time call tracing in a service-oriented system, including the modification and passing of a trace signature from one service to another service, according to one embodiment.

FIG. 3A illustrates further aspects of the example system environment for real-time call tracing in a service-oriented system, including the generation and passing of a trace signature from one service to another service, according to one embodiment. FIG. 3A and FIG. 3B represent an example of a call path in the service-oriented system 100. As shown in FIG. 3A, a service 110B may receive, using its request interface 150B, a root request 160. The root request may represent a request for the service 110B to perform one or more of its service functions 140B. To satisfy the root request 160, the service 110B may need to invoke another service 110N. To invoke the service function(s) 140N of the other service 110N, the service 110B may generate and send another request 161. With respect to the request 161, the service 110B may represent an upstream service while the service 110N may represent a downstream service.

The request 161 sent by the upstream service 110B to the downstream service 110N may include a trace signature that is generated by the service 110B. In one embodiment, requests through the service-oriented system may include a header or other metadata with a position for a trace signature. Because the root request 160 is the initial request in the illustrated example, it may lack a trace signature. The service 110B may use the signature generation component 120B to generate a new trace signature 126B. The trace signature 126B may indicate or represent a unique service identifier 115B of the service 110B. For example, the service ID 115B may include a numerical value that uniquely identifies the service 110B in the service-oriented system 100. In one embodiment, the signature generation 120B may apply a hashing function 125 to the service ID 115B in order to generate the trace signature 126B. For example, the signature generation 120B may call a cryptographic hash algorithm SHA-256 with an argument for the service ID 115B. The hash algorithm SHA-256 may generate an almost-unique 256-bit signature based on the input argument of the service ID 115B. In one embodiment, the trace signature 126B may include a bitmap, and the signature generation 120B may flip a bit in the bitmap that corresponds to the service 110B in order to indicate that the service 110B has participated in the call path. In one embodiment, the trace signature 126B may be stored in the header of the request 161. In one embodiment, the trace signature 126B may be of a particular data type and of a fixed size.

The downstream service 110N may receive the request 161 including the trace signature 126B. In one embodiment, the service 110N may use the trace signature 126B to decide how to handle the request 161. For example, if the service 110N is currently experiencing a high volume of incoming requests, then the service may use the trace signatures of requests to drop lower priority requests while performing higher priority requests. Using the component for signature analysis 130N, the service 110N may compare the trace signature 126B to a set of tier data 135N stored at the service 110N. In one embodiment, the tier data 135N may include one or more data structures that associate different trace signatures with different tiers, categories, or priorities. Based (at least in part) on the comparison of the trace signature 126B to the tier data 135N, the signature analysis 130N may determine a request tier (or category or priority) 136B to which the request 161 belongs. In one embodiment, the tier data 135N may include one or more Bloom filters that efficiently represent a large number of trace signatures and can be used to determine the membership of those trace signatures in one or more sets. Based (at least in part) on the request tier 136B determined for the request 161, the service 110N may decide to invoke the service function(s) 140N or instead discard the request without performing the requested function(s). If a request is discarded or dropped, the service 110N may send a response to the service 110B indicating that the request was dropped, or the service 110B may time-out the dropped request after a timeout period has elapsed.

FIG. 3B illustrates further aspects of the example system environment for real-time call tracing in a service-oriented system, including the modification and passing of a trace signature from one service to another service, according to one embodiment. FIG. 3B represents a continuation of the example of FIG. 3A. As shown in FIG. 3B and as discussed above, a service 110N may receive, using its request interface 150N, a request 161. The request may represent a request for the service 110N to perform one or more of its service functions 140N. To satisfy the request 161, the service 110N may need to invoke another service 110A. To invoke the service function(s) 140A of the other service 110A, the service 110N may generate and send another request 162. With respect to the request 162, the service 110N may represent an upstream service while the service 110A may represent a downstream service.

The request 161 received by the service 110N may include a trace signature 126B that was generated by the service 110B, and the request 162 sent by the service 110N to the service 110A may include a trace signature 126N that is generated by the service 110N. The service 110N may use the signature generation component 120N to modify the incoming trace signature 126B and produce a new trace signature 126N. The modified trace signature 126N may indicate or represent a unique service identifier 115N of the service 110N along with the unique service identifier 115B of the service 110B. The service ID 115N may include a numerical value that uniquely identifies the service 110N in the service-oriented system 100. In one embodiment, the signature generation 120N may apply a hashing function 125 to the trace signature 126B and the service ID 115N in order to generate the trace signature 126N. For example, the signature generation 120B may call a cryptographic hash algorithm SHA-256 with an argument that represents a concatenation of the trace signature 126B and the service ID 115N. The hash algorithm SHA-256 may generate an almost-unique 256-bit signature based on the input argument of the concatenation. In one embodiment, the trace signature 126N may include a bitmap, and the signature generation 120N may flip a bit in the bitmap that corresponds to the service 110N in order to indicate that the service 110B has participated in the call path. In one embodiment, the trace signature 126N may be stored in the header of the request 162. In one embodiment, the trace signature 126N may be of a particular data type and of the same size as the trace signature 126B.

The further downstream service 110A may receive the request 162 including the trace signature 126N. In one embodiment, the service 110A may use the trace signature 126N to decide how to handle the request 162. For example, if the service 110A is currently experiencing a high volume of incoming requests, then the service may use the trace signatures of requests to drop lower priority requests while performing higher priority requests. Using the component for signature analysis 130A, the service 110A may compare the trace signature 126N to a set of tier data 135A stored at the service 110A. In one embodiment, the tier data 135A may include one or more data structures that associate different trace signatures with different tiers, categories, or priorities. Based (at least in part) on the comparison of the trace signature 126N to the tier data 135A, the signature analysis 130A may determine a request tier (or category or priority) 136N to which the request 162 belongs. In one embodiment, the tier data 135A may include one or more Bloom filters that efficiently represent a large number of trace signatures and can be used to determine the membership of those trace signatures in one or more sets. Based (at least in part) on the request tier 136N determined for the request 162, the service 110A may decide to invoke the service function(s) 140A or instead discard the request without performing the requested function(s). If a request is discarded or dropped, the service 110A may send a response to the service 110N indicating that the request was dropped, or the service 110N may time-out the dropped request after a timeout period has elapsed.

Figure 4:
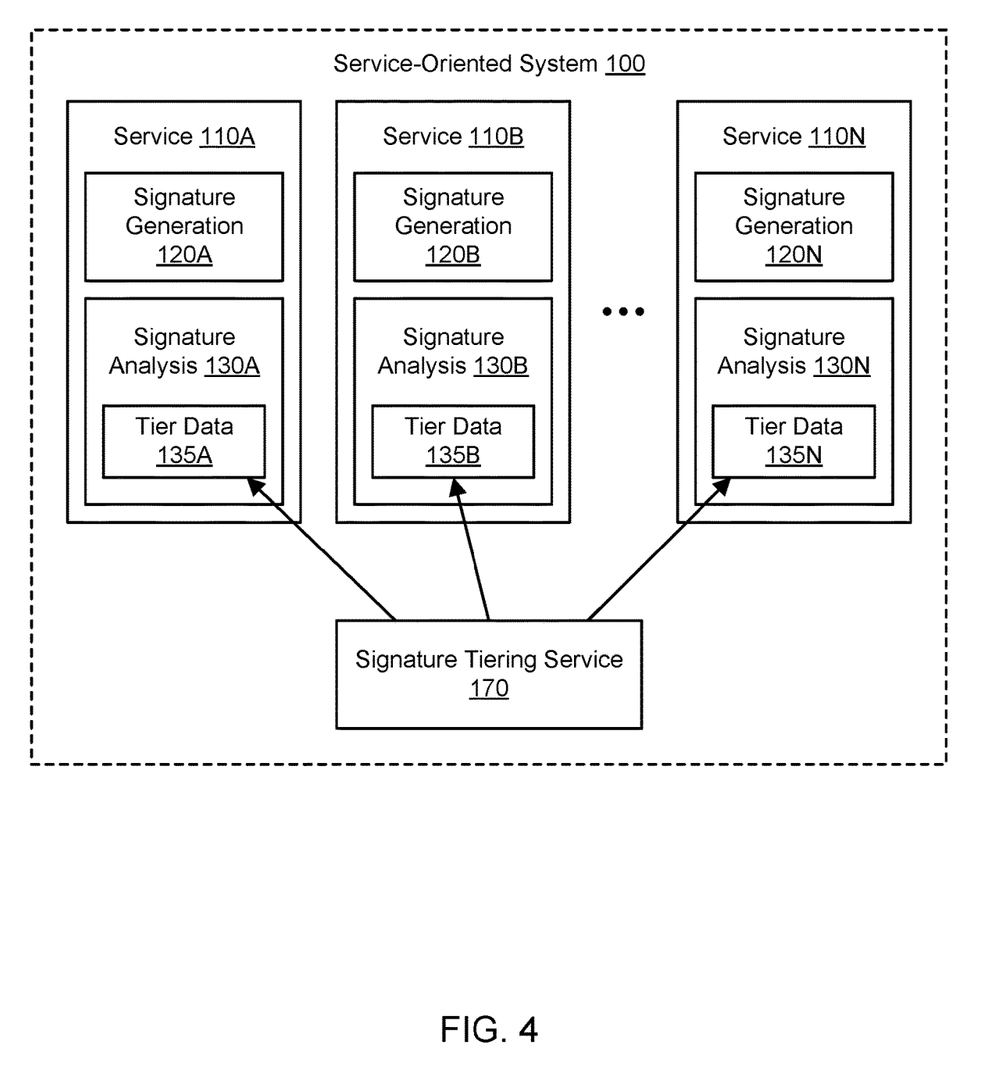
FIG. 4 illustrates further aspects of the example system environment for real-time call tracing in a service-oriented system, including the use of a signature tiering service to provide tier data to services, according to one embodiment.

FIG. 4 illustrates further aspects of the example system environment for real-time call tracing in a service-oriented system, including the use of a signature tiering service to provide tier data to services, according to one embodiment. A signature tiering service 170 may provide up-to-date tier data 135A-135N to the various services 110A-110N. As discussed above, the tier data 135A-135N may indicate the tiers, categories, and/or priorities to which particular trace signatures belong. In one embodiment, a particular service may subscribe to particular tiers, categories, and/or priorities, and the signature tiering service 170 may provide only the tiers, categories, and/or priorities to which a particular service has subscribed. For example, service 110A may subscribe to a different set of tiers, categories, and/or priorities than service 110B or service 110N. In one embodiment, the tier data 135A may differ from the tier data 135B which may differ from the tier data 135N. The tier data may be provided by the signature tiering service 170 to a particular service and then used numerous times at the recipient service to analyze inbound requests. The tier data may be recalculated periodically by the signature tiering service 170, and the updated tiering data may then be provided to relevant services 110A-110N. The signature tiering service 170 may include one or more computing devices, any of which may be implemented by the example computing device 3000 illustrated in FIG. 7.

In one embodiment, different tiers or categories of trace signatures may be represented in the tier data 135A-135N using one or more space-efficient data structures. In some embodiments, the data structure(s) may implement techniques that provide lossy resource-beneficial lookup with false positives or false negatives. In one embodiment, the data structure(s) may include one or more Bloom filters. A Bloom filter may represent a probabilistic data structure that may be employed to test whether an element, such as a trace signature, is a member of a set, such as a particular tier or category of upstream call path. In one embodiment, a Bloom filter may encode tens of thousands of different call paths into a data structure of a relatively small size. Using a Bloom filter, false positive matches may be possible, but false negative matches may not be possible; as more elements are added to the set, the probability of false positives may increase. In one embodiment, however, a Bloom filter may be used to determine which requests can be dropped with a high degree of certainty. In one embodiment, one or more Bloom filters may be used to determine the tiers or categories (if any) to which a request belongs. The different tiers or categories may represent different priorities for requests. For example, if the trace signature of a request indicates that the upstream call path began with a bot and not with a registered user, then the trace signature may be determined to belong to a lower priority tier, and a service may decide to discard the request.

In various embodiments, the categorization of a trace signature may affect the functioning of a service in a variety of ways, such that a service may determine or select one or more actions to perform (or not perform) with respect to a particular request. For example, a service may discard or perform a requested task based (at least in part) on analysis of its trace signature. As another example, costs attributed to upstream services may be assessed differently based (at least in part) on the categorization of trace signatures in requests. As a further example, the order in which to perform requests may be determined at a service based (at least in part) on the trace signatures of those requests. In some embodiments, the core logic used to satisfy a request may differ based (at least in part) on the trace signature of the request. As yet another example, access to restricted information may be permitted for some categories of trace signatures but not for other categories. As an additional example, unusual or unrecognized trace signatures may enable to detect intrusive or anomalous behavior and take action accordingly, e.g., by dropping the corresponding requests and/or notifying an appropriate entity. In some embodiments, alarms or notifications may be generated based (at least in part) on analysis of trace signatures at downstream services. For example, if intrusive or anomalous behavior is detected using trace signatures, then an administrator associated with the downstream service may be notified via messaging, an administrative console, or other appropriate means of communication.

Figure 5:
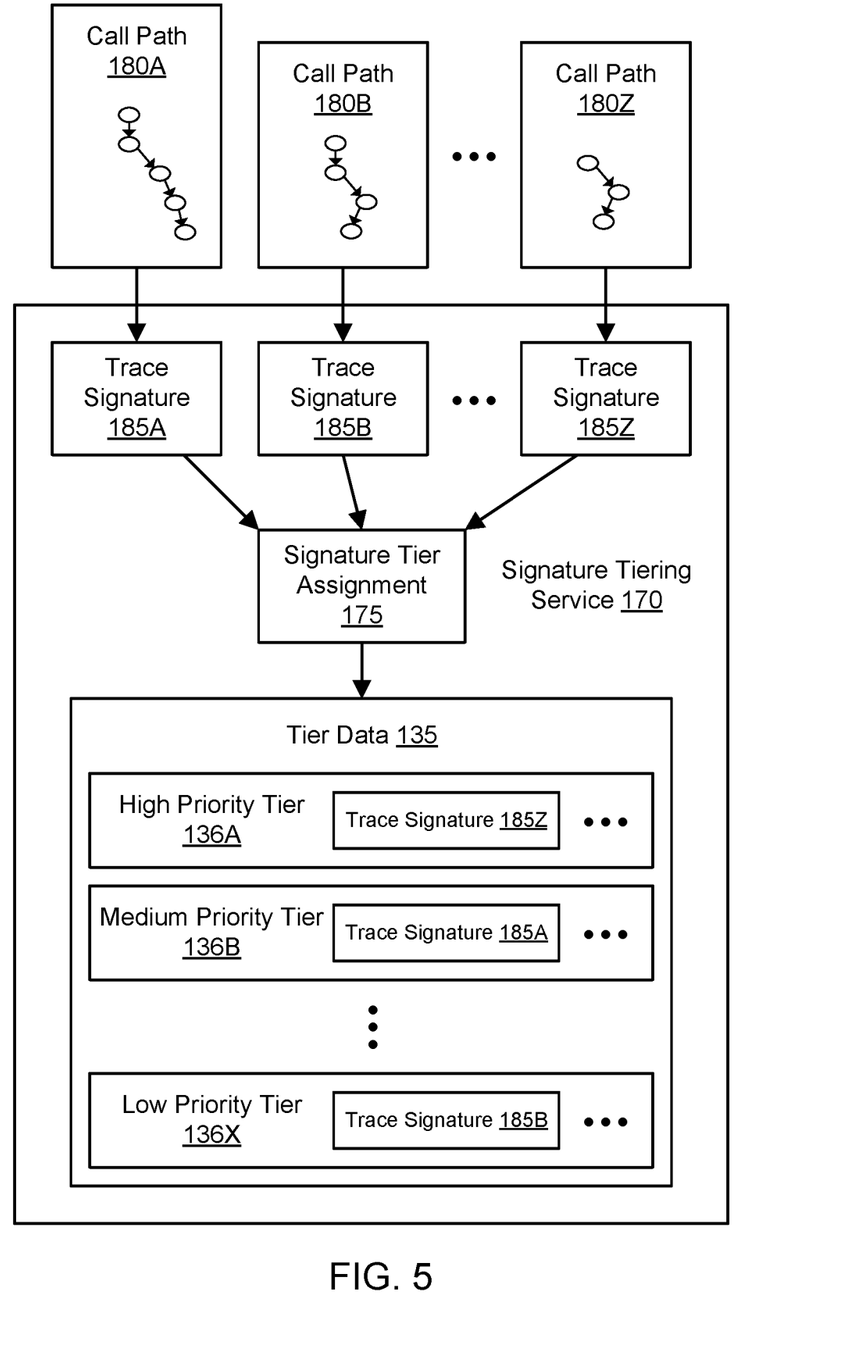
FIG. 5 illustrates further aspects of the example system environment for real-time call tracing in a service-oriented system, including the generation of tier data by a signature tiering service, according to one embodiment.

FIG. 5 illustrates further aspects of the example system environment for real-time call tracing in a service-oriented system, including the generation of tier data by a signature tiering service, according to one embodiment. As discussed above, different trace signatures may correspond to different upstream call paths in the service-oriented system 100, e.g., the paths from particular root requests to particular downstream services. For example, a trace signature 185A may correspond to a call path 180A, another trace signature 185B may correspond to another call path 180B, yet another trace signature 185Z may correspond to yet another call path 180Z, and so on. Using the signature tiering service 170, the trace signatures 185A-185Z may be analyzed and assigned to different tiers, categories, and/or priorities. In one embodiment, the signature tiering service 170 may include a component 175 for signature tier assignment.

In one embodiment, using the component 175, trace signatures may be manually assigned to different categories or tiers. In one embodiment, using the component 175, trace signatures may be automatically assigned to different categories or tiers using machine learning techniques. In one embodiment, trace signatures may be assigned to different categories or tiers by monitoring real-world traffic through the service-oriented system. In one embodiment, trace signatures may be assigned to different categories or tiers by generating synthetic traffic for the service-oriented system, e.g., in a test environment. For example, the tiers may represent different priority levels such as a high priority tier 136A, a medium priority tier 136B, a low priority tier 136X, and so on. In the example of FIG. 5, the signature tier assignment 175 may associate the trace signature 185Z with the high priority tier 136A, the trace signature 185A with the medium priority tier 136B, and the trace signature 136X with the low priority tier 136X.

For example, the trace signature 185Z may represent a request initiated by an authenticated user, the trace signature 185A may represent a request initiated by an unauthenticated user, and the trace signature 185B may represent a request initiated by a probable "bot."

The signature tiering service 170 may build one or more data structures such as Bloom filter(s) to capture these tiers 136A-136X and provide the data structure(s) to relevant services. The signature tiering service 170 may potentially keep the data structure(s) updated, e.g., by adding new call paths or modified call paths. In one embodiment, a particular service may obtain a Bloom filter (or other data structure) once from the external service that maintains the filter, and afterward the particular service may analyze the trace signatures of numerous requests using that filter. In one embodiment, services may subscribe to particular tiers or categories, and the up-to-date Bloom filter(s) (or other data structure(s)) for those tiers or categories may be provided by the signature tiering service 170.

Figure 6:
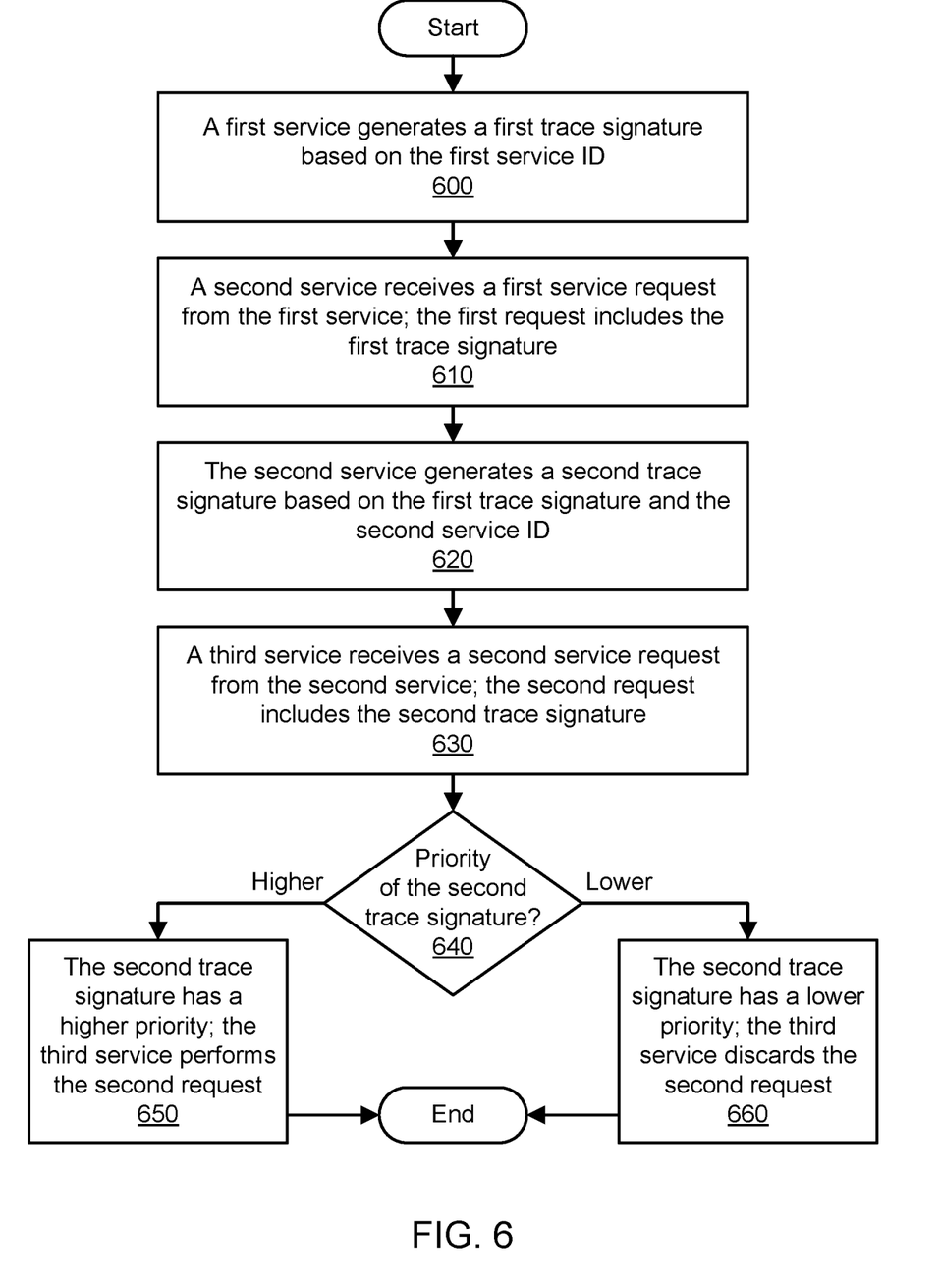
FIG. 6 is a flowchart illustrating a method for real-time call tracing in a service-oriented system, according to one embodiment.

FIG. 6 is a flowchart illustrating a method for real-time call tracing in a service-oriented system, according to one embodiment. A first service in a service-oriented system may be the recipient of an inbound request, e.g., a root request. To satisfy this inbound request, the first service may need to invoke a second service. To invoke the service function(s) of the second service, the first service may generate and send another request to the second service. As shown in 600, the first service may generate a first trace signature for inclusion in the outbound request to the second service. The first trace signature may be generated based (at least in part) on a service ID for the first service. If the inbound request is not a root request and included an existing trace signature, then the first trace signature may also be generated based (at least in part) on that existing trace signature of the inbound request. In one embodiment, the first service may apply a hashing function to its service ID in order to generate the first trace signature. For example, the first service may call a cryptographic hash algorithm SHA-256 with an argument for the service ID. The hash algorithm SHA-256 may generate an almost-unique 256-bit signature based on the input argument of the service ID. In one embodiment, the trace signature may include a bitmap, and the first service may flip a bit in the bitmap in order to indicate that the first service has participated in the call path. In one embodiment, the trace signature may be stored in the header of the outbound request. In one embodiment, the trace signature may be of a particular data type and of a fixed size that does not change throughout the call path.

As shown in 610, the second service may receive the first service request from the first service. The first request may include the first trace signature. In one embodiment, the second service may make a decision about how to handle the first request based (at least in part) on the first trace signature. For example, if the second service is experiencing a heavy request volume, then the second service may drop a request if its trace signature corresponds to a lower priority or may instead perform the request if its trace signature corresponds to a higher priority. In the example of FIG. 6, the second service may decide to perform the second request. To satisfy this second request, the second service may need to invoke a third service. To invoke the service function(s) of the third service, the second service may generate and send another request to the third service.

As shown in 620, the second service may generate a second trace signature for inclusion in the outbound request to the third service. The second trace signature may represent a modified version of the first trace signature. The second trace signature may be generated based (at least in part) on a service ID for the second service and also on the first trace signature. In one embodiment, the second service may apply a hashing function to the first trace signature and the second service ID in order to generate the modified trace signature. For example, the second service may call a cryptographic hash algorithm SHA-256 with an argument that represents a concatenation of the first trace signature and the second service ID. The hash algorithm SHA-256 may generate an almost-unique 256-bit signature based on the input argument of the concatenation. In one embodiment, the second trace signature may include a bitmap, and the second service may flip a bit in the bitmap in order to indicate that the second service has participated in the call path. In one embodiment, the second trace signature may be stored in the header of the outbound request. In one embodiment, the second trace signature may be of a particular data type and of a fixed size that does not change throughout the call path.

As shown in 630, the third service may receive the second service request from the second service. The second request may include the second trace signature. In one embodiment, the third service may make a decision about how to handle the second request based (at least in part) on the second trace signature. For example, if the third service is experiencing a heavy request volume, then the third service may drop a request if its trace signature corresponds to a lower priority or may instead perform the request if its trace signature corresponds to a higher priority. In the example of FIG. 6, the second service may make such a decision based (at least in part) on the second trace signature. The second trace signature may represent the call path of a plurality of services, including the first and second services, that are upstream from the third service. In one embodiment, this call path may be associated with a particular tier, category, or level of priority, as predetermined by a component of the service-oriented system. As shown in 640, the tier, category, or level of priority of the second trace signature may be determined. As shown in 650, if the second trace signature is of a sufficiently high priority, then the third service may attempt to perform the one or more function(s) invoked by the second request. As shown in 660, if the second trace signature is of a sufficiently low priority, then the third service may not attempt to perform the one or more function(s) invoked by the second request and may instead discard or drop the second request. In either case, the third service may send an appropriate response to the second service. Using the techniques shown in FIG. 6, a downstream service may perform real-time call tracing in a distributed system and may locally make decisions based (at least in part) on that real-time call tracing.

Illustrative Computer System

Figure 7:
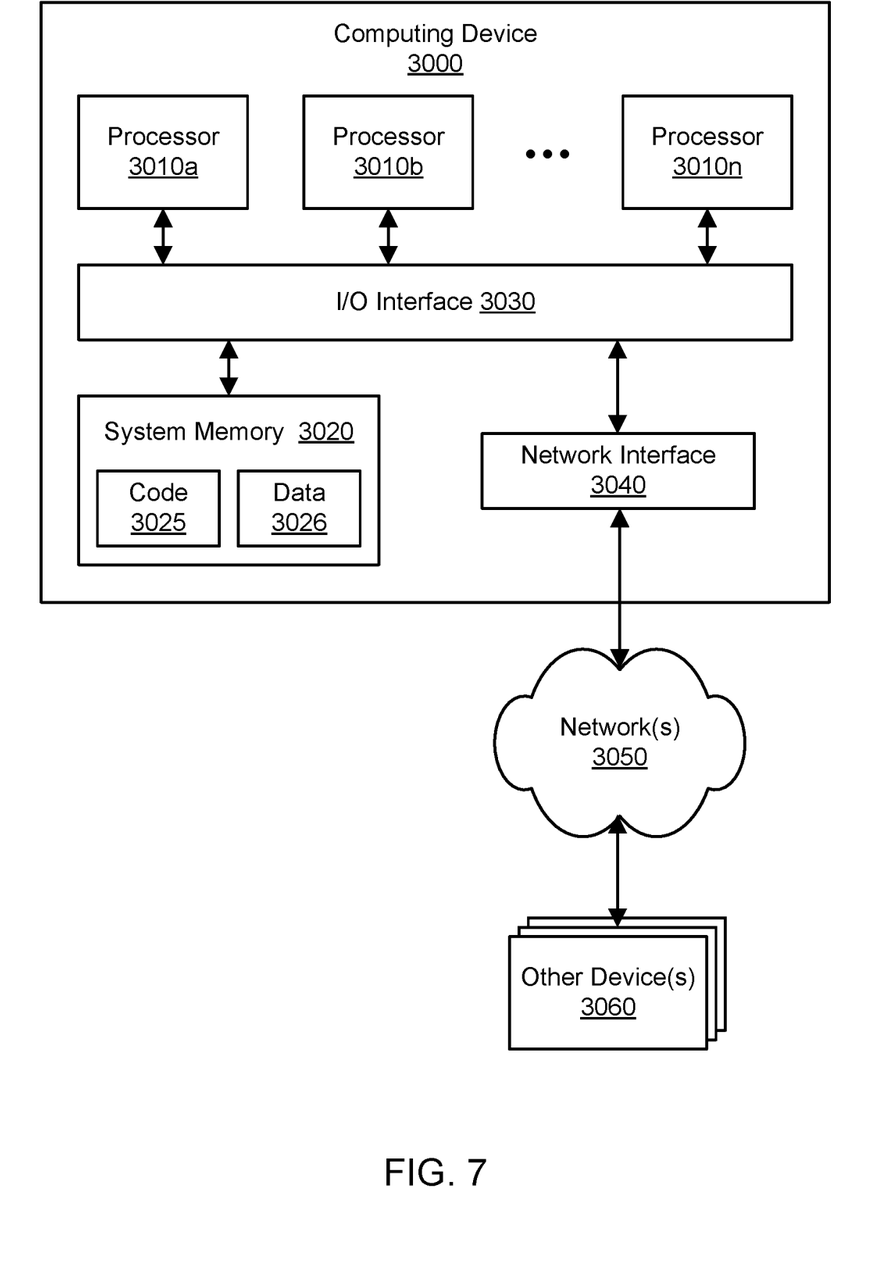
FIG. 7 illustrates an example computing device that may be used in some embodiments.

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement a service-oriented system, wherein the service-oriented system comprises a plurality of services including a first service, a second service, and a third service, and wherein the computing devices are configured to:
generate, at the first service, a first trace signature based at least in part on an identifier of the first service, wherein the first trace signature comprises data identifying the first service;
receive, at the second service from the first service, a first request comprising the first trace signature;
generate, at the second service, a second trace signature based at least in part on the first trace signature and an identifier of the second service, wherein the second trace signature comprises data identifying the first service and the second service;
receive, at the third service from the second service, a second request comprising the second trace signature; and
determine, at the third service, whether to perform or discard the second request based at least in part on the second trace signature, wherein the second trace signature represents an upstream call path associated with the second request.

2. The system as recited in claim 1, wherein determining whether to perform or discard requests at the third service is enabled based at least in part on the third service exceeding a threshold quantity of requests.

3. The system as recited in claim 1, wherein the first trace signature is generated using a hash function at least on the identifier of the first service, and wherein the second trace signature is generated using the hash function at least on the first trace signature and the identifier of the second service.

4. The system as recited in claim 1, wherein the third service determines whether to perform or discard the second request based at least in part on a Bloom filter, wherein the Bloom filter comprises a representation of a plurality of request tiers for call paths corresponding to trace signatures, and wherein the Bloom filter is received at the third service prior to the second request.

5. A computer-implemented method, comprising:
receiving, at a service in a service-oriented system, a request comprising a trace signature, wherein the trace signature comprises a representation of one or more upstream services in an upstream call path associated with the request; and
determining, based at least in part on the trace signature, whether the service is to perform the request or discard the request.

6. The method as recited in claim 5, wherein the upstream call path represented by the trace signature is associated with a lower priority, and wherein determining comprises determining to discard the request.

7. The method as recited in claim 5, wherein the upstream call path represented by the trace signature is associated with a higher priority, and wherein determining comprises determining to perform the request.

8. The method as recited in claim 5, wherein the determining is further based at least in part on the service exceeding a threshold quantity of requests.

9. The method as recited in claim 5, further comprising:
generating, at the service, a modified trace signature based at least in part on the trace signature and an identifier of the service; and
sending, from the service to a downstream service, an additional request comprising the modified trace signature, wherein the modified trace signature comprises a representation of the service and the one or more upstream services in an upstream call path associated with the additional request.

10. The method as recited in claim 9, wherein the trace signature is generated using a hash function, and wherein the modified trace signature is generated using the hash function on the trace signature and the identifier of the service.

11. The method as recited in claim 9, wherein the modified trace signature is not larger in size than the trace signature.

12. The method as recited in claim 5, wherein the determining comprises:
analyzing the trace signature using a Bloom filter, wherein the Bloom filter comprises a representation of a plurality of request tiers for call paths corresponding to trace signatures, and wherein the Bloom filter is received at the service prior to the request.

13. The method as recited in claim 5, wherein the trace signature comprises a bitmap, wherein individual bits in the bitmap represent respective services in the service-oriented system, and wherein the bitmap indicates a membership of the one or more upstream services in the upstream call path.

14. A computer-readable storage medium storing program instructions computer-executable to perform:
   receiving, at a service in a service-oriented system, a request comprising a trace signature, wherein the trace signature comprises a representation of one or more upstream services in an upstream call path associated with the request; and
   determining, by the service based at least in part on the trace signature, whether the service is to perform the request or discard the request.

15. The computer-readable storage medium as recited in claim 14, wherein the upstream call path represented by the trace signature is associated with a lower priority, and wherein the determining further comprises determining to delay satisfaction of the request.

16. The computer-readable storage medium as recited in claim 14, wherein the determining further comprises determining whether to allow or deny access to restricted information associated with satisfaction of the request.

17. The computer-readable storage medium as recited in claim 14, wherein the determining further comprises determining whether to raise raising an alarm associated with the request.

18. The computer-readable storage medium as recited in claim 14, wherein the program instructions are further computer-executable to perform:
   generating, at the service, a modified trace signature based at least in part on the trace signature and an identifier of the service; and
   sending, from the service to a downstream service, an additional request comprising the modified trace signature, wherein the modified trace signature comprises a representation of the service and the one or more upstream services in an upstream call path associated with the additional request.

19. The computer-readable storage medium as recited in claim 18, wherein the trace signature is generated using a hash function, and wherein the modified trace signature is generated using the hash function on the trace signature and the identifier of the service.

20. The computer-readable storage medium as recited in claim 14, wherein the determining further comprises:
   analyzing the trace signature using a Bloom filter, wherein the Bloom filter comprises a representation of a plurality of request tiers for call paths corresponding to trace signatures, and wherein the Bloom filter is received at the service prior to the request.

* * * * *